United States Patent
Breyer et al.

(10) Patent No.: US 9,184,836 B2
(45) Date of Patent: Nov. 10, 2015

(54) DATA TRANSMISSION SYSTEM AND METHOD FOR TRANSMITTING DATA IN A DATA TRANSMISSION SYSTEM

(75) Inventors: Florian Breyer, München (DE); Sebastian Randel, München (DE); Joachim Walewski, Unterhaching (DE)

(73) Assignee: SIEMENS AKTIENGESELLSCAFT, Munich (DE)

( * ) Notice: Subject to any disclaimer, the term of this patent is extended or adjusted under 35 U.S.C. 154(b) by 529 days.

(21) Appl. No.: 12/733,135

(22) PCT Filed: Jul. 10, 2008

(86) PCT No.: PCT/EP2008/058982
§ 371 (c)(1),
(2), (4) Date: Feb. 12, 2010

(87) PCT Pub. No.: WO2009/019106
PCT Pub. Date: Feb. 12, 2009

(65) Prior Publication Data
US 2010/0142965 A1    Jun. 10, 2010

(30) Foreign Application Priority Data

Aug. 6, 2007 (DE) .......................... 10 2007 037 026
Jan. 3, 2008 (DE) .......................... 10 2008 003 089

(51) Int. Cl.
*H04B 10/00* (2013.01)
*H04B 10/06* (2006.01)
*H04B 10/114* (2013.01)

(52) U.S. Cl.
CPC .................. *H04B 10/1141* (2013.01)

(58) Field of Classification Search
CPC .................................................. H04B 10/1141
USPC .......................... 398/158, 118–139
See application file for complete search history.

(56) References Cited

U.S. PATENT DOCUMENTS 3,927,316 A * 12/1975 Citta .............................. 398/163
4,019,048 A *  4/1977 Maione et al. ................. 398/155

(Continued)

FOREIGN PATENT DOCUMENTS

CN        1394007        1/2003
EP        1077543 A1     2/2001

(Continued)

OTHER PUBLICATIONS

J. Grubor et al., "High-speed wireless indoor communication via visible light" in: ITG-Fachtagung "Breitbandversorgung in Deutschland—Vielfalt für alle?", ITG Fachbericht, vol. 198, pp. 201-206, Berlin, Germany, Mar. 7-8, 2007.

(Continued)

*Primary Examiner* — Abbas H Alagheband
(74) *Attorney, Agent, or Firm* — Staas & Halsey LLP

(57) ABSTRACT

A data transmission system has a light-emitting transmitter, a light-receiving receiver and a data transmission channel based on incoherent light. A pre-equalization device connected upstream of the transmitter is provided for the purpose of pre-equalizing a data signal which is to be transmitted from the transmitter to the receiver via the data transmission channel. The data transmission channel has constant transmission conditions within prescribed limits. The data signal to be transmitted is transmitted using a prescribed maximum bandwidth of the transmitter.

13 Claims, 1 Drawing Sheet

(56) References Cited

U.S. PATENT DOCUMENTS

| | | | | |
|---|---|---|---|---|
| 4,068,222 | A | * | 1/1978 | Treviranus .................... 340/556 |
| 4,399,564 | A | * | 8/1983 | Cowen .......................... 398/163 |
| 4,481,658 | A | * | 11/1984 | Schmidt ........................ 381/14 |
| 4,493,114 | A | * | 1/1985 | Geller et al. .................. 398/119 |
| 4,534,614 | A | * | 8/1985 | Silverglate ................... 250/216 |
| 4,777,663 | A | * | 10/1988 | Charlton ....................... 398/147 |
| 5,023,947 | A | * | 6/1991 | Cimini et al. ................. 398/202 |
| 5,329,210 | A | * | 7/1994 | Peterson et al. .............. 315/246 |
| 5,369,520 | A | * | 11/1994 | Avramopoulos et al. ..... 398/175 |
| 5,463,620 | A | * | 10/1995 | Sriram ......................... 370/412 |
| 5,469,475 | A | * | 11/1995 | Voorman ...................... 375/247 |
| 5,631,758 | A | * | 5/1997 | Knox et al. ................... 398/75 |
| 5,757,859 | A | * | 5/1998 | Retzer et al. ................. 375/346 |
| 5,917,634 | A | * | 6/1999 | Otobe .......................... 398/201 |
| 6,259,555 | B1 | | 7/2001 | Meli et al. |
| 6,724,376 | B2 * | | 4/2004 | Sakura et al. ................ 345/204 |
| 6,744,808 | B1 * | | 6/2004 | Walley et al. ................ 375/146 |
| 7,173,551 | B2 * | | 2/2007 | Vrazel et al. ................. 341/144 |
| 7,246,171 | B1 * | | 7/2007 | Ambrose ...................... 709/233 |
| 7,385,959 | B1 * | | 6/2008 | Loc .............................. 370/338 |
| 7,437,082 | B1 * | | 10/2008 | Smith ........................... 398/175 |
| 7,542,684 | B2 * | | 6/2009 | Matsuda ....................... 398/189 |
| 7,606,494 | B1 * | | 10/2009 | Weston-Dawkes et al. .... 398/83 |
| 7,650,082 | B2 * | | 1/2010 | Yamada et al. .............. 398/198 |
| 8,582,577 | B2 * | | 11/2013 | Thi et al. ...................... 370/392 |
| 2001/0019580 | A1 * | | 9/2001 | McDonald et al. ........... 375/219 |
| 2001/0026387 | A1 * | | 10/2001 | Poustie ......................... 359/161 |
| 2001/0033583 | A1 * | | 10/2001 | Rabenko et al. ............. 370/503 |
| 2002/0041625 | A1 * | | 4/2002 | Ojard ........................... 375/219 |
| 2003/0034432 | A1 | | 2/2003 | Presby et al. |
| 2004/0105609 | A1 * | | 6/2004 | Stegmuller ..................... 385/14 |
| 2004/0136448 | A1 * | | 7/2004 | Miller ........................... 375/222 |
| 2004/0208603 | A1 * | | 10/2004 | Hekkel et al. ................ 398/140 |
| 2004/0208614 | A1 * | | 10/2004 | Price ............................ 398/152 |
| 2004/0213579 | A1 * | | 10/2004 | Chew et al. .................. 398/183 |
| 2005/0025485 | A1 * | | 2/2005 | Lee et al. ..................... 398/71 |
| 2005/0243946 | A1 * | | 11/2005 | Chung et al. ................. 375/297 |
| 2006/0239286 | A1 * | | 10/2006 | Schneider .................... 370/412 |
| 2007/0032256 | A1 * | | 2/2007 | Kolze ........................... 455/522 |
| 2007/0152749 | A1 * | | 7/2007 | Liu ............................... 330/129 |
| 2008/0062873 | A1 * | | 3/2008 | Semrad et al. ................ 370/232 |
| 2008/0125071 | A1 * | | 5/2008 | Maeda et al. ................. 455/313 |
| 2008/0219671 | A1 * | | 9/2008 | Schmitt ......................... 398/130 |
| 2008/0301533 | A1 * | | 12/2008 | Lee et al. ...................... 714/774 |
| 2008/0318527 | A1 * | | 12/2008 | Higuchi et al. ................ 455/42 |
| 2011/0255571 | A1 * | | 10/2011 | Caffrey et al. ................ 375/141 |

FOREIGN PATENT DOCUMENTS

| | | | |
|---|---|---|---|
| GB | 2079088 A | * 2/1982 | ............... H04B 9/00 |
| JP | 56-90634 | 7/1981 | |
| JP | 62-48139 | 3/1987 | |
| JP | 62-298243 | 12/1987 | |
| JP | 63-176033 | 7/1988 | |
| JP | 6-69544 | 3/1994 | |
| JP | 9-135205 | 5/1997 | |
| JP | 11-54800 | 2/1999 | |
| JP | 2001-512922 | 8/2001 | |
| JP | 2001-326569 | 11/2001 | |
| JP | 2003-124519 | 4/2003 | |
| JP | 2006-128393 | 5/2006 | |
| JP | 2007-36940 | 2/2007 | |
| JP | 2007-43592 | 2/2007 | |
| KR | 100719896 | 5/2007 | |

OTHER PUBLICATIONS

SK. L. Sterckx et al., "On the use of pre-distortion equalization in inrared wireless communication links", IEEE International Conference on Communications, vol. 7, pp. 2166-2170, 2001.

German language Japanese Office Action for related Japanese Application No. 2010-519404, mailed on Nov. 11, 2011.

Chinese Office Action for related Chinese Patent Application No. 200880102113.5, issued May 22, 2013, 11 pages.

Korean Notice of Allowance for related Korean Patent Application No. 10-2010-7004982, issued Jan. 9, 2014, 12 pages.

*IEEE Std 802.15.7™*, IEEE Computer Society, Sep. 6, 2011, pp. 1-286 (309 total pages).

* cited by examiner

DATA TRANSMISSION SYSTEM AND METHOD FOR TRANSMITTING DATA IN A DATA TRANSMISSION SYSTEM

CROSS REFERENCE TO RELATED APPLICATIONS

This application is based on and hereby claims priority to PCT Application No. PCT/EP2008/058982 filed on Jul. 10, 2008, DE Application No. 10 2008 003 089.9 filed on Jan. 3, 2008 and DE Application No. 10 2007 037 026.3 filed on Aug. 6, 2007, the contents of which are hereby incorporated by reference.

BACKGROUND OF THE INVENTION

The invention relates to a data transmission system having a light-emitting transmitter, a light-receiving receiver and a data transmission channel based on incoherent light. The invention also relates to a method for transmission in such a data transmission system.

With a so-called free space transmission, in particular a data transmission in the close range with incoherent light by a rapid modulation of the optical power of an optical light source, it is disadvantageous that data rates above 40 MBit/s cannot be realized using simple modulation methods, like for instance the on-off keying (OOK). The reason for this is that the minimal modulation bandwidth of the transmitter and of the receiver can result in a blurring of the data signal and thus in a superimposition of transmitted symbols. IR (infrared) LEDs in the data transmission standard IrDA (Infrared Data Association) or also fluorescent tubes can be used as optical sources in such a data transmission system to transmit visible light for instance. White light LEDs are in principle also possible as optical sources. Their continually improving efficiency nevertheless results in a restriction in the useable modulation bandwidth, thereby impeding the achievement of high data rates.

A higher spectral efficiency can, as is known, impede a bandwidth restriction in a transmission channel. A multistage modulation can be used here for instance. With this, the symbols are embodied for so long that no significant superimposition of the transmitted symbols takes place. To increase the data rates, symbols with a higher value can be transmitted instead of a logical "1" and a logical "0", e.g. logical "2", "3", "4" etc. The amplitude is then greater by the factor 2, 3 or 4 for instance than with a logical "1" (Pulse Amplitude Modulation, PAM). Within digital imaging, gray scales are the counterpart to this multistage modulation.

With the afore-cited pulse amplitude modulation, 2 bits can therefore be transmitted in each symbol, namely "00", "01", "10" or "11". This means that with N different amplitudes/gray scales $\log^2(N)$, more bits can be transmitted per symbol than with the modulation method on-off keying. If the transmission speed in the case of on-off keying is restricted to 25 MBit/s for instance, then 125 MBit/s can be transmitted with $2^5=32$ amplitudes/gray scales.

It is common to all multistage modulation methods that the output received by the receiver and also the signal-to-noise ratio has to be greater than in the case of on-off keying, so that the amplitudes/gray scales can be clearly distinguished from one another. A further common feature is that the linearity of the data transmission system has to be improved.

In connection with the data transmission by way of a wireless infrared transmission channel, the use of a pre-equalization of the data signal to be transmitted by way of the transmission channel is known (cf. K. L. Sterckx and J. M. H. Elmirghani, "On the Use or Pre-distortion Equalization in Infrared Wireless Communication Connections" IEEE International Conference on Communications, Vol. 7, Pgs. 2166-2170, 2001). Here the special instance of an untargeted transmission, i.e. a transmission during which the transmitter and the receiver can "see" one another, determines why a significant portion of the light radiation output by the transmitter is reflective diffusely. Such a reflection can be produced by walls and/or fixtures/fittings in a room. With the data transmission described in this document, a bandwidth restriction exists in the free space channel, i.e. the "blurring" of the transmitted symbols materialize as result of single or multiple reflections on the walls for instance. The data transmission system described in this document is disadvantageous in that the pre-equalization depends on the transmission function of the free space channel. For instance the transmission function is dependent on whether and which furniture is present in the room of the data transmission system. This however results in the pre-equalization having to be adjusted to the respective environment and also to changes, which, provided it is actually possible, requires a return channel of the receiver in order to adjust the pre-equalization to the change in the free space channel. As a result, a data transmission system made from the system perspective is too complex and too expensive.

SUMMARY

It is therefore one possible object to specify a data transmission system and a method for transmitting data in a data transmission system, which enable a data transmission in the close range with incoherent light by a rapid modulation of the optical power of an optical source with transmission speeds of more than 40 MBit/s and in particular more than 100 MBit/s.

The inventors propose a data transmission system having a light-emitting transmitter, a light-receiving receiver and a data transmission channel based on incoherent light. In the proposed system, provision is made for a pre-equalization device, which is arranged upstream of the transmitter, for pre-equalizing a data signal to be transmitted from the transmitter to the receiver by way of the data transmission channel. The data transmission channel has constant transmission conditions within prescribed limits. The data signal to be transmitted is transmitted with a prescribed maximum bandwidth of the transmitter.

The data transmission channel based on incoherent light implies that the transmitter and the receiver are embodied to output and to receive incoherent light respectively.

The proposal relates to the principle of using the pre-equalization for direct transmissions. This has the property that reflections are negligible in the case of such a transmission channel. Constant transmission conditions thus exist. The use of pre-equalization for increasing the data rate across the bandwidth-restricted incoherent transmission channel is advantageous compared with the multistage modulation in that considerably lower demands are placed on the linearity of the data transmission system. An assignment of the equalization to the transmitter is also advantageous in the case of non-diffuse transmission channels in that the complexity of the receiver is clearly reduced in comparison with the related art. One further advantage is that receivers which exist in practice can be used for instance for the on-off keying, since the equalization is arranged upstream of the transmitter, i.e. takes place in the transmitter.

The data transmission channel is expediently not restricted in terms of its bandwidth.

A targeted data transmission of the data signal in the free space between the transmitter and the receiver is preferably used as a data transmission channel. Provision can also be made for the data transmission channel to have no diffuse reflections. The data transmission channel can also be embodied as a point-to-point connection between the transmitter and the receiver. The use of a direct connection is advantageous in that the pre-equalization only depends on a defined transmission function from the transmitter and receiver and not on the transmission function of the transmission channel. A data transmission system can herewith be provided in a particularly simple and cost-effective fashion. It is possible for instance to change the location (e.g. the room) of the transmitter without herewith influencing the transmission speed of the data transmission system.

According to a further expedient embodiment, the bandwidth restriction of the data transmission channel is at a data rate that is higher than the bandwidth of the sensor and/or of the receiver. In the publication J. Grubor, O. C. Gaete, J. W. Walewski, S. Randel and K.-D. Langer, "High Speed Wireless Indoor Communication via Visible Light", in ITG specialist conference "Breitbandversorgung in Deutschland—Vielfalt fuer alle?" ["Broadband supply in Germany, variety for everyone?", ITG technical report, volume 198, page 201, Berlin, Germany, 7 to 8 Mar. 2007, the use of ceiling lamps as transmitters for the data transmission shows that the bandwidth of the transmission channel for typical offices is at 200 MHz and higher and therefore extends far beyond the bandwidth of typical incoherent transmitters (light sources) and receivers. Their bandwidths are usually smaller than 50 MHz. A light-emitting diode (LED), in particular a white light LED or an infrared LED, a fluorescent tube, a bulb, can be used as a transmitter.

The use of the data transmission system in a data transmission scenario, as described in Grubor et al., is advantageous in that the pre-equalization does not have to be adjusted to environmental changes. This results in it being possible to adjust the pre-equalization to the transmitter and receiver to be used even during production, which as a result guarantees a continuously high transmission rate.

According to a further embodiment of the data transmission system, the data transmission channel only allows a data transmission from the transmitter to the receiver. This is thus a so-called Simplex connection, with, contrary to the related art, a return channel not being required for adapting the pre-equalization.

The receiver can be embodied for instance as a photo diode, in particular as a PIN (Positive Intrinsic Negative) diode.

In a further embodiment, provision can also be made for the data signal to be suppliable to an equalizer coupled to the receiver, in order to implement a further equalization which is arranged downstream of the reception of the data signal.

The inventors also propose a method for transmitting data in a data transmission system having a light-emitting transmitter, a light-receiving receiver and a data transmission channel based on incoherent light. In the proposed method, a data signal to be transmitted from the transmitter to the receiver via the data transmission channel is pre-equalized in a pre-equalization device arranged upstream of the transmitter. The data signal is transmitted to the receiver by way of the data transmission channel, which comprises constant transmission conditions within prescribed limits. The transmission of the data signal takes place here using a prescribed maximum bandwidth of the transmitter.

The method has the same advantages as were described in conjunction with the data transmission system.

In one embodiment of the method, the data transmission channel is not restricted in terms of its bandwidth.

Provision is also made for a targeted data transmission of the data signal to be used in the free space as a data transmission channel, in particular without diffuse reflections, between the transmitter and the receiver.

In accordance with a further embodiment of the proposed method, a point-to-point connection between the transmitter and the receiver is used as a data transmission channel.

In a further embodiment, the broadband restriction of the data transmission channel is selected to be at a higher maximum data rate than the broadband(s) of the transmitter and/or the receiver.

Provision is also made for the data transmission channel to only allow a data transmission from the transmitter to the receiver, as a result of which a one-way communication is provided.

BRIEF DESCRIPTION OF THE DRAWINGS

These and other objects and advantages of the present invention will become more apparent and more readily appreciated from the following description of the preferred embodiments, taken in conjunction with the accompanying drawings of which.

DETAILED DESCRIPTION OF THE PREFERRED EMBODIMENT

Figure 1A:
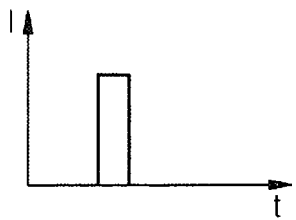
FIGS. 1A and 1B show the problem of blurring a modulated data signal as a function of a selected modulation bandwidth, the problem occurring during the data transmission in the close range with incoherent light.

Reference will now be made in detail to the preferred embodiments of the present invention, examples of which are illustrated in the accompanying drawings, wherein like reference numerals refer to like elements throughout.

FIG. 1A illustrates the problems occurring during the data transmission in the close range with incoherent light by rapid modulation of the optical power of an optical source. In the upper diagram in FIG. 1A, the data signal to be transmitted is shown in the form of a current pulse. A current pulse corresponds for instance to the logical "1". As a result of the properties of the transmitter, an optical source, like for instance a light-emitting diode, fluorescent tube, or a bulb, the course of the optical power P_opt shown with K1 in the lower diagram of FIG. 1A results in the case of a high broadband restriction, the course corresponding approximately to the course of the current pulse and thus being ideal. With a lower bandwidth restriction, the course shown with K2 results from the current pulse, in which course a "blurring" takes place. The receiver herewith has the problem of having to identify from the "blurred" course whether or not a logical "1" or a logical "0" was transmitted. It is readily apparent from FIG. 1A that the bandwidth restriction is the cause of the output of the optical power P-opt in response to a signal (here: the current pulse) supplied to the transmitter. In the event of a light-emitting diode, a bandwidth restriction results due to the size thereof, the selected material and its efficiency.

Figure 1B:
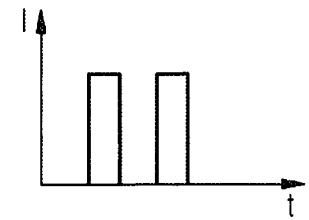
Figure 1B:
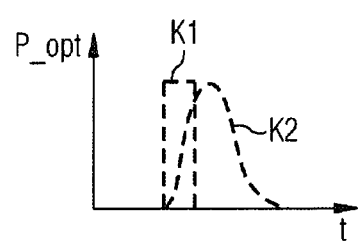
Figure 1B:
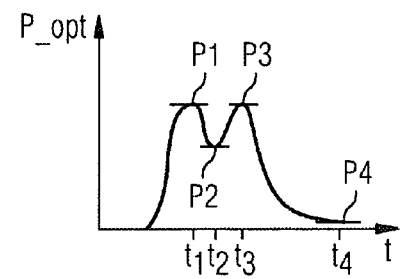

A first problem resulting herefrom is apparent with the aid of FIG. 1B, in which the bit sequence "101" is supplied to the transmitter of a data transmission system for instance. When considering the optical power P_opt output by the transmitter, a transmitter with a minimal bandwidth restriction (according to the curve K2 in FIG. 1A) is used as base here. As apparent from the lower diagram in FIG. 1B, the transmitted bit sequence "101" has to be decoded by the receiver from the received optical power, the bit sequence being faulty as a result of the "blurring" of this data signal. As a result of the transmission properties of the transmitter, the points P1 and P3, which correspond to logical "1" in each instance have the same sum of optical power P_opt. The points P2 and P4 by contrast have a varyingly high optical power P-opt, although both correspond to a logical "0". It is therefore difficult for the receiver to determine whether point P2 corresponds in particular to a logical "1" or a logical "0".

A second problem is that unavoidable noise, e.g. in the receiver analogue electronics system, results in the useable distance between a logical "0" and a logical "1" being even smaller. With significant blurring and corresponding noise, no significant distinction can therefore be determined between a "1" and a "0" in the case of a bit sequence ("101" sequence).

Figure 2:
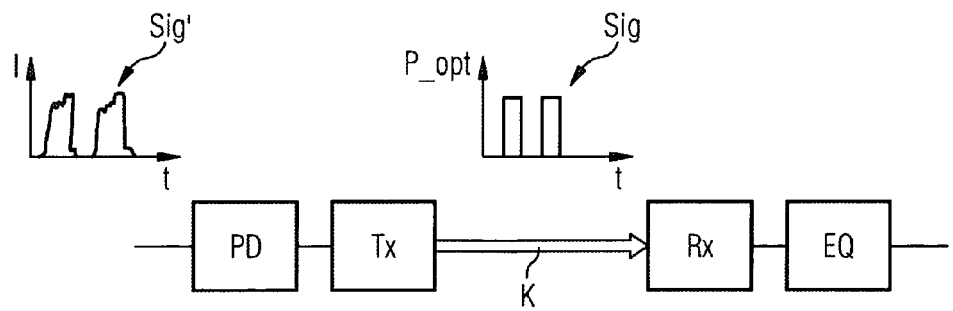
FIG. 2 shows a schematic representation of the data transmission system.

FIG. 2 shows a schematic representation of the proposed procedure, in order to circumvent the afore-described problem and at the same to achieve a high data rate of for instance 100 MBit/s during a data transmission in the close range with incoherent light. The data transmission system has a transmitter Tx, which transmits a data signal Sig to a receiver Rx by way of a wireless optical transmission channel K. A pre-equalization device PD is arranged upstream of the transmitter Tx. This is supplied with a data signal Sig' to be transmitted, with the signal to be transmitted by the transmitter Tx being prepared by the pre-equalization device PD such that the optical power P_opt output by the transmitter corresponds approximately to a rectangular signal (cf. data signal Sig), which can be easily decoded by the receiver Rx.

One requirement for achieving the high data rate is that the transmission channel K is stable, i.e. has constant transmission conditions within predescribed limits and is ideally not bandwidth-restricted. To this end, a targeted data transmission can be provided in the free space as a data transmission channel KI, in particular without diffuse reflections, between the transmitter Tx and the receiver Rx. The data transmission channel K can be embodied in particular as a point-to-point connection between the transmitter and the receiver. It is expedient here for the bandwidth restriction (maximum data rate) of the transmission channel K to lie far above the bandwidths of the transmitter Tx and the receiver Rx as a result of reflections. This can be ensured for instance by embodying the transmitter Tx as a light-emitting diode (white light or LED), bulb or fluorescent tube.

As a result of the pre-equalization performed, which can be integrated into the transmitter Tx, no return channel is required from the receiver Rx in order to adapt the pre-equalization. The transmission channel K can therefore be embodied as a simplex or one-way connection.

As the pre-equalization does not have to be adjusted to environmental conditions, this can already be adjusted to the light source and the receiver to be used during the production. A continually high transmission rate is already guaranteed in this way.

The use of pre-equalization to increase the data speeds across bandwidth-restricted, incoherent transmission paths is advantageous by comparison with the multistage modulation described in the introduction such that lower demands are placed on the linearity of the data transmission system.

The positioning of the pre-equalization in the transmitter and/or the transmitter-side performance of the equalization (pre-equalization) is also advantageous in the case of non-diffuse transmission paths such that the complexity of the receiver Rx can be kept to a minimum.

The focus on direct connections (point-to-point connection) is advantageous in that the pre-equalization still only depends on a fixed transmission function of the transmitter and receiver, but not on the transmission channel. A transmitter can therefore be arranged in another room without as a result the transmission speed having been influenced.

One further advantage of pre-equalization relates to it being possible to use conventional receivers, as are used in the modulation method on-off keying.

As shown in FIG. 2, in addition to the necessary pre-equalization, a receive-side pre-equalization device EQ can optionally also be provided, in order to further improve the data signal Sig.

The invention has been described in detail with particular reference to preferred embodiments thereof and examples, but it will be understood that variations and modifications can be effected within the spirit and scope of the invention covered by the claims which may include the phrase "at least one of A, B and C" as an alternative expression that means one or more of A, B and C may be used, contrary to the holding in Superguide v. DIRECTV, 69 USPQ2d 1865 (Fed. Cir. 2004).

The invention claimed is:

1. An incoherent light data transmission system comprising:
   an incoherent light-emitting transmitter;
   an incoherent light-receiving receiver;
   a free space data transmission channel based on incoherent light; and
   a pre-equalization device arranged upstream of the transmitter, configured to pre-equalize a data signal to be transmitted as an initial data transmission from the transmitter to the receiver by way of the data transmission channel, the data signal being pre-equalized such that an optical power output by the transmitter more closely corresponds to a rectangular signal than a before-equalization data signal, wherein
   the data transmission channel comprises constant transmission conditions within prescribed limits,
   the transmission of the data signal to be transmitted takes place with a predetermined maximum bandwidth of the transmitter,
   the data transmission channel has a maximum bandwidth that is greater than both the maximum bandwidth of the transmitter and a maximum bandwidth of the receiver,
   an equalizer is configured to supply the data signal and is coupled to the receiver in order to implement a receiver equalization which is arranged downstream of the reception of the data signal, and
   a targeted data transmission of the data signal in a free space between the transmitter and the receiver is used as the data transmission channel.

2. The data transmission system as claimed in claim 1, wherein the data transmission channel does not have any diffuse reflections.

3. The data transmission system as claimed in claim 1, wherein the data transmission channel allows a data transmission only from the transmitter to the receiver.

4. The data transmission system as claimed in claim 1, wherein the transmitter is a light-emitting diode (LED) selected from a group consisting of a white light LED and an infrared LED.

5. The data transmission system as claimed in claim 1, wherein the transmitter is a fluorescent tube.

6. The data transmission system as claimed in claim 1, wherein the transmitter is a bulb.

7. The data transmission system as claimed in claim 1, wherein the receiver is a photodiode, the photodiode being a PIN diode.

8. A method for transmitting data, comprising:
transmitting incoherent light from an incoherent light-emitting transmitter;
receiving incoherent light at an incoherent light-receiving receiver;
conducting incoherent light from the transmitter to the receiver, through a free space data transmission channel based on incoherent light; and
arranging a pre-equalization device upstream of the transmitter, the pre-equalization device being configured to pre-equalize a data signal to be transmitted as an initial data transmission from the transmitter to the receiver by way of the data transmission channel, the data signal being pre-equalized such that an optical power output by the transmitter more closely corresponds to a rectangular signal than a before-equalization data signal, wherein
the data transmission channel comprises constant transmission conditions within prescribed limits,
the transmission of the data signal to be transmitted takes place with a predetermined maximum bandwidth of the transmitter,
the data transmission channel has a maximum bandwidth that is greater than both the maximum bandwidth of the transmitter and a maximum bandwidth of the receiver,
an equalizer is configured to supply the data signal and is coupled to the receiver in order to implement a receiver equalization which is arranged downstream of the reception of the data signal, and
a targeted data transmission of the data signal in a free space, without diffuse reflections, between the transmitter and the receiver is used as the data transmission channel.

9. The method as claimed in claim 8, wherein the data transmission channel allows a data transmission only from the transmitter to the receiver.

10. The data transmission system as claimed in claim 1, wherein no return channel is provided from the receiver to the transmitter.

11. The method as claimed in claim 8, wherein no return channel is provided from the receiver to the transmitter.

12. The data transmission system as claimed in claim 1, wherein the transmitter uses on-off keying to modulate the data signal.

13. The data transmission system as claimed in claim 8, wherein the transmitter uses on-off keying to modulate the data signal.

* * * * *

UNITED STATES PATENT AND TRADEMARK OFFICE
CERTIFICATE OF CORRECTION

| | | |
|---|---|---|
| PATENT NO. | : 9,184,836 B2 | Page 1 of 1 |
| APPLICATION NO. | : 12/733135 | |
| DATED | : November 10, 2015 | |
| INVENTOR(S) | : Florian Breyer et al. | |

It is certified that error appears in the above-identified patent and that said Letters Patent is hereby corrected as shown below:

On The Title Page, Item (73), Column 1 (Assignee), Line 1
    Delete "AKTIENGESELLSCAFT," and insert -- AKTIENGESELLSCHAFT, --, therefor.

Signed and Sealed this
Nineteenth Day of April, 2016

Michelle K. Lee
*Director of the United States Patent and Trademark Office*